(12) United States Patent
Kim et al.

(10) Patent No.: US 7,168,077 B2
(45) Date of Patent: Jan. 23, 2007

(54) SYSTEM AND METHOD OF EXECUTING AND CONTROLLING WORKFLOW PROCESSES

(75) Inventors: Yeong-Ho Kim, Herndon, VA (US); Misuk Lee, Seoul (KR)

(73) Assignee: Handysoft Corporation, Vienna, VA (US)

( * ) Notice: Subject to any disclaimer, the term of this patent is extended or adjusted under 35 U.S.C. 154(b) by 290 days.

(21) Appl. No.: 10/355,253

(22) Filed: Jan. 31, 2003

(65) Prior Publication Data

US 2004/0153350 A1    Aug. 5, 2004

(51) Int. Cl.
G06F 9/46    (2006.01)

(52) U.S. Cl. .............................. 718/106; 705/8; 705/9; 717/136; 717/106; 709/225

(58) Field of Classification Search ............... 705/8; 709/205; 717/106; 718/106
See application file for complete search history.

(56) References Cited

U.S. PATENT DOCUMENTS

| 5,930,512 | A | * | 7/1999 | Boden et al. ............... 717/102 |
| 6,041,306 | A | * | 3/2000 | Du et al. ......................... 705/8 |
| 6,225,998 | B1 | * | 5/2001 | Okita et al. .................. 715/853 |
| 6,286,129 | B1 | * | 9/2001 | Agarwal et al. ............ 717/105 |
| 6,397,192 | B1 | | 5/2002 | Notani et al. |
| 6,442,528 | B1 | | 8/2002 | Notani et al. |
| 6,845,507 | B2 | * | 1/2005 | Kenton ......................... 719/314 |

(Continued)

FOREIGN PATENT DOCUMENTS

JP    2001-297299    10/2001

(Continued)

OTHER PUBLICATIONS

Volker et al "Workflow Management based on Process Model Repositories", 1998, IEEE; pp. 379388.*

(Continued)

Primary Examiner—Romain Jeanty
(74) Attorney, Agent, or Firm—H.C. Park & Associates, PLC

(57) ABSTRACT

A method of executing and controlling a workflow process includes a request-response control process for coordinating activities between a plurality of entities, whereby an entity creates and sends a message requesting execution of an activity and another entity receives, parses and responds to the request. The message includes activity-specific data and activity status data. The activity status data signifies, for example, whether a corresponding activity has been successfully performed (i.e., completed) or failed. Process information, including control logic for the workflow process, is specified in an at least one uncompiled document, which may include an extensible stylesheet and an extensible markup language document. A document type definition defines the structure of the document. The control logic may include serial, AND-parallel, OR-parallel, XOR-parallel, CON-parallel and iterative instructions and a definition of successful completion and/or failure for an activity according to the control logic. The control logic also specifies a forward transition for a completed activity and a backward transition for a failed activity. A parser processes the message according to the control logic for the workflow process and the document type definition. A compiled workflow engine and database are not required.

27 Claims, 17 Drawing Sheets

| Block | Description of control logic |
|---|---|
| Serial | Every component activity has only one preceding activity and only one succeeding activity. As soon as an activity is completed successfully, its succeeding activity can be started immediately. |
| AND-parallel | All of its component activities are executed concurrently. Successful completion of all the component activities makes the next activity start. If any component activity fails, the whole process also fails. |
| OR-parallel | All of its component activities are executed concurrently. If any component activity succeeds, the next activity starts. The whole process fails only when all the activities fail. |
| XOR-parallel | Every component activity is associated with a priority, and the component activity with the highest priority is executed first. When a component activity fails, an activity having the next highest priority is tried. When an activity succeeds, all the other activities are ignored, and the next activity is started. |
| CON-parallel | Only activities that meet the given condition are executed. If any parallel activity succeeds, the next activity starts. |
| Iterative | The iterative block forms a cycle. When the last activity of the iteration finishes, the iteration-condition is checked. If the condition is not satisfied, the whole iteration is executed again. |

U.S. PATENT DOCUMENTS

| | | |
|---|---|---|
| 2002/0010741 A1 | 1/2002 | Stewart et al. |
| 2002/0040312 A1 | 4/2002 | Dhar et al. |
| 2002/0052769 A1 | 5/2002 | Navani et al. |
| 2002/0065701 A1 | 5/2002 | Kim et al. |
| 2002/0111989 A1 | 8/2002 | Ambler et al. |
| 2002/0128890 A1 | 9/2002 | Dick et al. |
| 2002/0138543 A1 | 9/2002 | Teng et al. |
| 2002/0138577 A1 | 9/2002 | Teng et al. |
| 2002/0161823 A1 | 10/2002 | Casati et al. |
| 2002/0161859 A1 | 10/2002 | Willcox et al. |
| 2002/0174000 A1 | 11/2002 | Katz et al. |
| 2002/0174238 A1 | 11/2002 | Sinn et al. |

FOREIGN PATENT DOCUMENTS

| | | |
|---|---|---|
| JP | 2002-41744 | 2/2002 |

OTHER PUBLICATIONS

HandySoft Corp ("HandySoft Release BizFlow-2000 New Web-Based Product Tailored Specifically for Commercial and Government Workflow Management".*

Walter et al; "SGML crosses technology-adoption chasm into the bowling alley", Jan. 1996, Seybold Report on Publishing System v25, n9, p3(13); Dialog file 275, Accession No. 01895718.*

* cited by examiner

| Block | Description of control logic |
|---|---|
| Serial | Every component activity has only one preceding activity and only one succeeding activity. As soon as an activity is completed successfully, its succeeding activity can be started immediately. |
| AND-parallel | All of its component activities are executed concurrently. Successful completion of all the component activities makes the next activity start. If any component activity fails, the whole process also fails. |
| OR-parallel | All of its component activities are executed concurrently. If any component activity succeeds, the next activity starts. The whole process fails only when all the activities fail. |
| XOR-parallel | Every component activity is associated with a priority, and the component activity with the highest priority is executed first. When a component activity fails, an activity having the next highest priority is tried. When an activity succeeds, all the other activities are ignored, and the next activity is started. |
| CON-parallel | Only activities that meet the given condition are executed. If any parallel activity succeeds, the next activity starts. |
| Iterative | The iterative block forms a cycle. When the last activity of the iteration finishes, the iteration-condition is checked. If the condition is not satisfied, the whole iteration is executed again. |

Figure 7

DTD of X-IBP

```
<?xml version="1.0" encoding="UTF—8"?>

<!ELEMENT IBP (IBP_Header, Wf_Process)>

<!ELEMENT IBP_Header (ID, Name, Creator, Creation_Date, Description, Server_ID)>

<!ELEMENT ID (#PCDATA)>
<!ELEMENT Name (#PCDATA)>
<!ELEMENT Creator (#PCDATA)>
<!ELEMENT Creation_Date (#PCDATA)>
<!ELEMENT Description (#PCDATA)>
<!ELEMENT Server_ID (#PCDATA)>

<!ELEMENT Wf_Process (Block)>

<!ELEMENT Block ( (Activity|Block)?)>
<!ATTLIST Block
type (Serial | AND_Parallel | OR_parallel | XOR_parallel | CON_parallel ) #REQUIRED
ID CDATA #REQUIRED
status (Ready | Executing | Completed | Failed) #REQUIRED
condition CDATA #IMPLIED>

<!ELEMENT Activity (Name, Description, Participant, Message*)>
<!ATTLIST Activity
type (Primitive | Iterative) #REQUIRED
ID CDATA #REQUIRED
status (Ready | Executing | Completed | Failed) #REQUIRED
condition CDATA #IMPLIED
iteration_activity CDATA #IMPLIED>

<!ELEMENT Name (#PCDATA)>
<!ELEMENT Description (#PCDATA)>
<!ELEMENT Participant (#PCDATA)>
<!ELEMENT Message (#PCDATA)>
<!ATTLIST Message
type (Request | Response) #REQUIRED
status (Ready | Executing | Completed | Failed) #REQUIRED>
```

Figure 10

```xml
<Wf_Process>
<Block type="Serial" ID="B0" status="Executing">
 <Activity type=" Primitive" ID="start" status="Completed">  </Activity>
 <Block type="XOR_parallel" ID="B1" status=" Completed">
  <Block type="Serial" ID="B3" status=" Completed">
   <Activity type="Primitive" ID="A1" status="Completed"> ... </Activity>
   <Activity type="Primitive" ID="A2" status="Completed">   </Activity>
  </Block>
  <Block type="Serial" ID="B4" status="Ready">
   <Activity type="Primitive" ID="A3" status="Ready">  </Activity>
   <Block type="OR" ID="B5" status="Ready">
    <Activity type="Primitive" ID="A4" status="Ready">  </Activity>
    <Activity type="Primitive" ID="A5" status="Ready">  </Activity>
   </Block>
   <Activity type="Primitive" ID="A6" status="Ready">  </Activity>
  </Block>
 </Block>
 <Activity type= "Primitive" I D="A7" status="Executing">
  <Name>Receiving production order</Name>
  <Description>Receiving production order from PS department</Description>
  <Participant> ABC company </Participant>
  <Message type="request" status="Executing">msg_box/IBP10001/A701.xml</Message> <Message type="response" status="Executing">msg_box/IBP10001/A711.xml</Message>
 </Activity>
 <Activity type=" Primitive' ID="A8" status="Ready">  </Activity>
 <Block type="AND_parallel" ID="B2" status="Ready">
  <Block type="Serial" ID="B6" status="Ready">
   <Activity type="Primitive" ID="A9" status="Ready">  </Activity>
   <Activity type="Primitive" ID="A10" status="Ready">  </Activity>
  </Block>
  <Block type="AND" ID="B7" status="Ready">
   <Activity type=" Primitive' I D="A1 1" status= "Ready">  </Activity>
   <Activity type="Primitive" ID="A12" status="Ready">  </Activity>
  </Block>
 </Block>
 <Activity type=" Primitive" ID="end" status="Ready">  </Activity>
</Block>
</Wt_Process>
```

Figure 11

```
<xsl:template match="Wf_Process/Block">
  <xsl:choose>
    <xsl:when test="descendant::Activity[child::Participant = $wfms_key]/parent::Block[@type ='Serial']">
      <xsl:variable name="next_sibling" select="local-name(descendant::Activity[child::Participant
      = $wfms_key]/following-sibling::node() [position()=1])"/>
      <xsl:choose>
        <xsl:when test="$next_sibling = 'Activity'">
          <xsl call-template name="serial_transition"/>
        </xsl: when>
        <xsl:when test="$next_sibling = 'Block'">
          <xsl:call-template name="split_transition"/>
        </xsl:when>
        <xsl otherwise>
          <xsl:call-template name="merge_transition"/>
        </xsl otherwise>
      </xsl:choose>
    </xsl:when>
    <xsl:otherwise>
      <xsl:call-template name="merge_transition"/>
    </xsl:otherwise>
  </xsl:template>

<xsl:template name="completed_message">
  <redirect:write select="$file_name">
    <WfMessage Version "1.0">
      <WfTransport/>
      <WfMessageHeader>
        <Request ResponseRequired="Yes">
        </Request>
        <key><xsl:value-of select="Participant"/></key>
      </WfMessageHeader>
      <CreateProcessInstance.Request StartImmediately="true">
        <ObserverKey>
          <xsl:value-of select="/IBP/IBP_Header/ID"/>
        </ObserverKey>
        <ContextData>... </ContextData>
      </CreateProcessInstance.Request>
    </WfMessage>
  </redirect:write>
```

Figure 14

SYSTEM AND METHOD OF EXECUTING AND CONTROLLING WORKFLOW PROCESSES

BACKGROUND OF THE INVENTION

1. Field of the Invention

The present invention generally relates to workflow processes. More particularly, the present invention relates to a system and method for executing and controlling workflow processes without dependence upon a conventional workflow engine.

2. Background Description

The prosperity of e-commerce has magnified the need for integrating business processes. While many workflow management systems (WFMS) exist for managing business processes within an enterprise, they are not well suited for efficiently managing business processes across multiple enterprises. In particular, automation of inter-organizational business processes (IBPs), i.e., business processes that span across a plurality of organizations, typically requires participating companies to either use the same cumbersome and expensive workflow management system or adhere to an open standard, neither of which are practical solutions in a world of businesses with diverse interests, preferences, needs and resources. Consequently, there is a need for a system and methodology to facilitate automation of business processes, which may include inter-organizational business processes, without dependence upon a conventional workflow management system comprised of a workflow engine and database.

The present invention is directed to overcoming one or more of the problems as set forth above.

SUMMARY OF THE INVENTION

It is an object of the present invention to provide a system and method of executing and controlling workflow processes.

It is another object of the present invention to provide a system and method of executing and controlling workflow processes, including inter-organizational business processes.

It is still another object of the present invention to provide a system and method of executing and controlling workflow processes without dependence upon a conventional workflow management system comprised of a workflow engine and database.

It is a further object of the present invention to provide a system and method of executing and controlling workflow processes using messages, variables and process rules defined in documents that do not require compilation or processing by a workflow engine.

It is yet a further object of the present invention to provide a methodology for defining a process control logic and a process model for a workflow process.

According to an exemplary implementation of the invention, a method of executing and controlling a workflow process includes a request-response control process for coordinating activities between a plurality of entities, whereby an entity creates and sends a message requesting execution of an activity and another entity receives, parses and responds to the request. A message includes activity-specific data and activity status data. The activity status data signifies whether a corresponding activity has been successfully performed (i.e., completed) or failed. Process information including control logic for the workflow process is specified in an at least one uncompiled document, which may include an extensible stylesheet and an extensible markup language document. A document type definition defines the structure of the document. The control logic may include serial, AND-parallel, OR-parallel, XOR-parallel, CON-parallel and iterative instructions and a definition of successful completion and/or failure for an activity according to the control logic. The control logic also specifies a forward transition for a completed activity and a backward transition for a failed activity. A parser processes the message according to the control logic for the workflow process and the document type definition. A compiled workflow engine is not required.

BRIEF DESCRIPTION OF THE DRAWINGS

The foregoing and other objects, aspects, and advantages will be better understood from the following detailed description of a preferred embodiment of the invention with reference to the drawings, in which:

FIG. 7 is a table of exemplary blocks and process control logic descriptions;

FIG. 10 is an exemplary Document Type Definition (DTD) which defines a document structure of an XML document in accordance with an implementation of the present invention;

FIG. 11 is an exemplary X-IBP document representing a block tree as illustrated in FIG. 9;

FIG. 14 shows a portion of an exemplary XS-PCL in accordance with an implementation of the present invention for illustrative purposes, including an exemplary control logic and exemplary commands for creating an X-MSG of "Completed";

DETAILED DESCRIPTION OF A PREFERRED EMBODIMENT OF THE INVENTION

Figure 1:
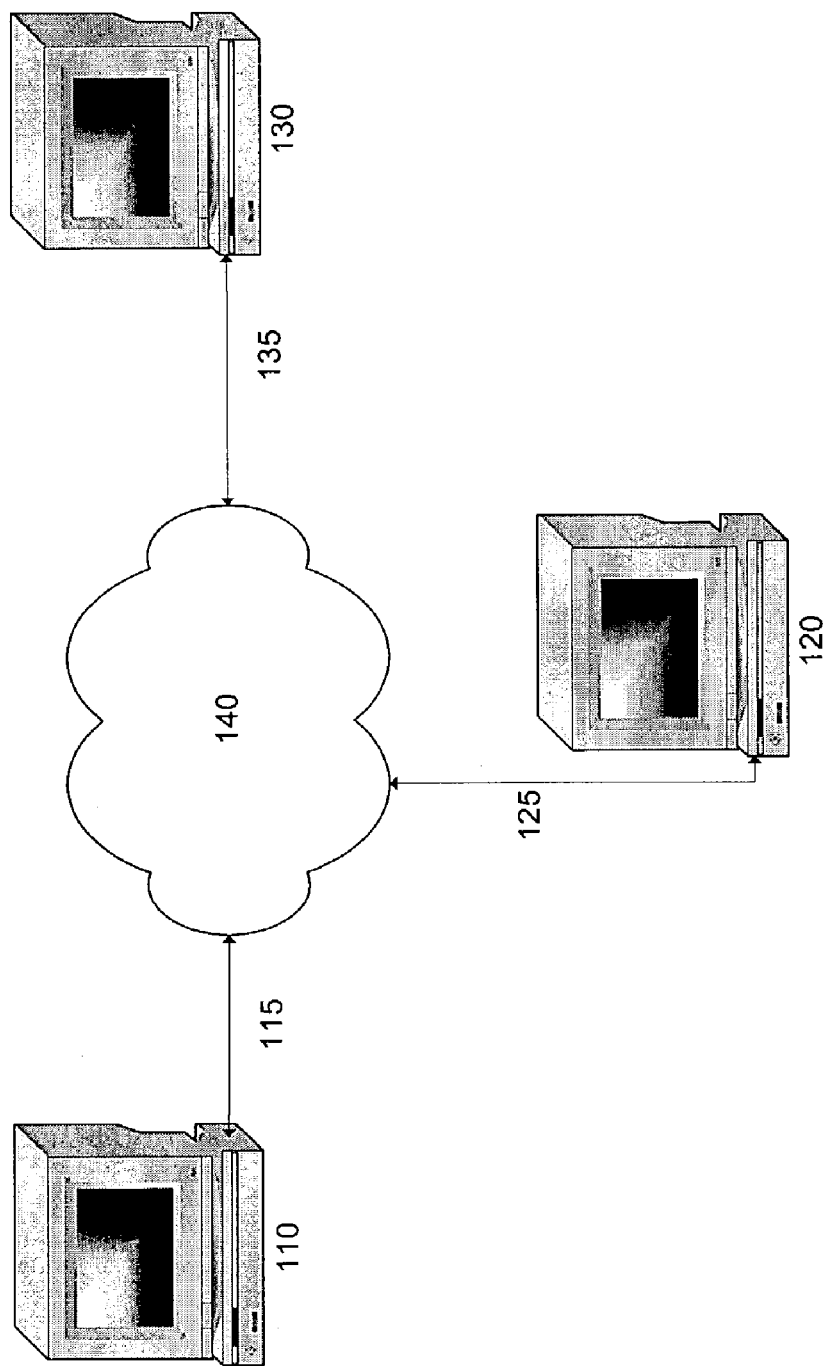
FIG. 1 conceptually shows an exemplary computing and network environment in which a system and methodology in accordance with the present invention may be implemented.

Referring to FIG. 1, an exemplary computing and network environment for implementing a system and methodology in accordance with the present invention is conceptually shown. A plurality of computing devices 110, 120 and 130 are communicatively coupled via network communication means 115, 125, 135 and 140. By way of example and not limitation, three computers are conceptually shown. Those skilled in the art will appreciate that other configurations with fewer or more computers may be used to implement a workflow execution and control methodology in accordance with the present invention.

Each computing device 110, 120 and 130 may, for example, be a conventional computer with a processing unit, a system memory and a system bus that communicatively couples various system components including the system memory to the processing unit. The system bus may be any of several types of bus structures using any of a variety of bus architectures. The system memory may include read only memory (ROM) and random access memory (RAM). A basic input/output system (BIOS), containing routines that help to transfer information between elements within the computer may be stored in ROM. The computer may also include storage devices such as a magnetic hard disk drive, a magnetic disk drive for reading from or writing to removable magnetic disk, and an optical disk drive for reading from or writing to a removable optical disk such as a CD-ROM or other optical media. The magnetic hard disk drive, magnetic disk drive, and optical disk drive may be connected to the system bus by a hard disk drive interface, a magnetic disk drive-interface, and an optical drive interface, respectively. The drives and their associated computer-readable media provide nonvolatile storage of computer readable instructions, data structures, program modules and other data for the computer. These elements are typically included in most computer systems and the aforementioned system is intended to represent a broad category of systems supporting transmission, receipt and processing of extensible markup language (XML) messages.

Software for implementing a system and methodology in accordance with the present invention on the above-referenced computing environment may be stored on the hard disk, magnetic disk, optical disk, ROM or RAM. The software may include an operating system, one or more application programs, other program modules, and program data. Firmware, application specific integrated circuits and other manifestations of computer processing instructions and data may be employed in lieu of or in addition to software without departing from the scope of the present invention.

A process may be automated or require user input or intervention. A user may enter commands and information into the computer through input devices such as a keyboard and pointing device. Other input devices (not shown) such as a microphone, scanner or the like may be employed. These and other input devices may be connected to the processing unit through an interface coupled to system bus, such as a serial port, parallel port or universal serial bus (USB). A monitor or other type of display device may also be connected to system bus via an interface, such as video adapter. In addition to the monitor, the computer may include other peripheral output devices (not shown), such as speakers and printers.

Of course, the computer system may include fewer, different and/or additional elements, provided it is capable of performing steps in accordance with the present invention. Those skilled in the art will appreciate that the invention may be practiced with other computer system configurations, including hand-held devices, multi-processor systems, programmable equipment and machinery, minicomputers, mainframe computers, and the like. The invention may also be practiced in distributed computing environments where tasks are performed by remote processing devices that are linked through a communications network with program modules located in local and/or remote storage devices.

Each computer may operate in a networked environment using logical connections to one or more remote computers. By way of example and not limitation, the network may be a local area network (LAN) and/or a wide area network (WAN), including the Internet, a combination of the foregoing, or some other means of communicating computer readable data between remote computers. Such networking environments are commonplace.

While the preferred implementation of present invention employs extensible markup language (XML) and extensible stylesheet language (XSL) and document type definitions (DTDs), those skilled in the art will appreciate that other programming and scripting languages and definitions, including (without limitation) predecessors, successors and variants of XML, XSL and DTD, as well as other languages, formats and definitions based on or derived from SGML (ISO 8879), or other languages or standards that enable creating, defining and processing of business process rules and workflow data in documents, files and/or objects that do not require compilation or processing by a workflow engine to automatically control a workflow may be employed without departing from the scope of the present invention. Those skilled in the art will also appreciate that software used to implement and practice the present invention may, for example, include (without limitation) tools for creating, modifying and documenting DTDs and XSL style sheets, including cascading style sheet (CSS) editors, DTD documenters, DTD editors, DTD generators, DTD parsers, schema converters, XSL checkers, XSL converters, XSL transformation (XSLT) editors and generators; tools for scripted creation and modification of XML documents; tools for supporting document management, such as document databases and search engines; XML document database systems for storing XML documents and providing access to their structure and individual parts; XML document management utilities; tools for interactive creation, modification and composition of XML documents; tools for electronic delivery and display of XML documents; XML parsers, parsing toolkits; XML middleware; XML validators; XSL engines that support XSL formatting objects specification; and XSLT engines that support XSLT specification, all of which are well known in the art.

Figure 2:
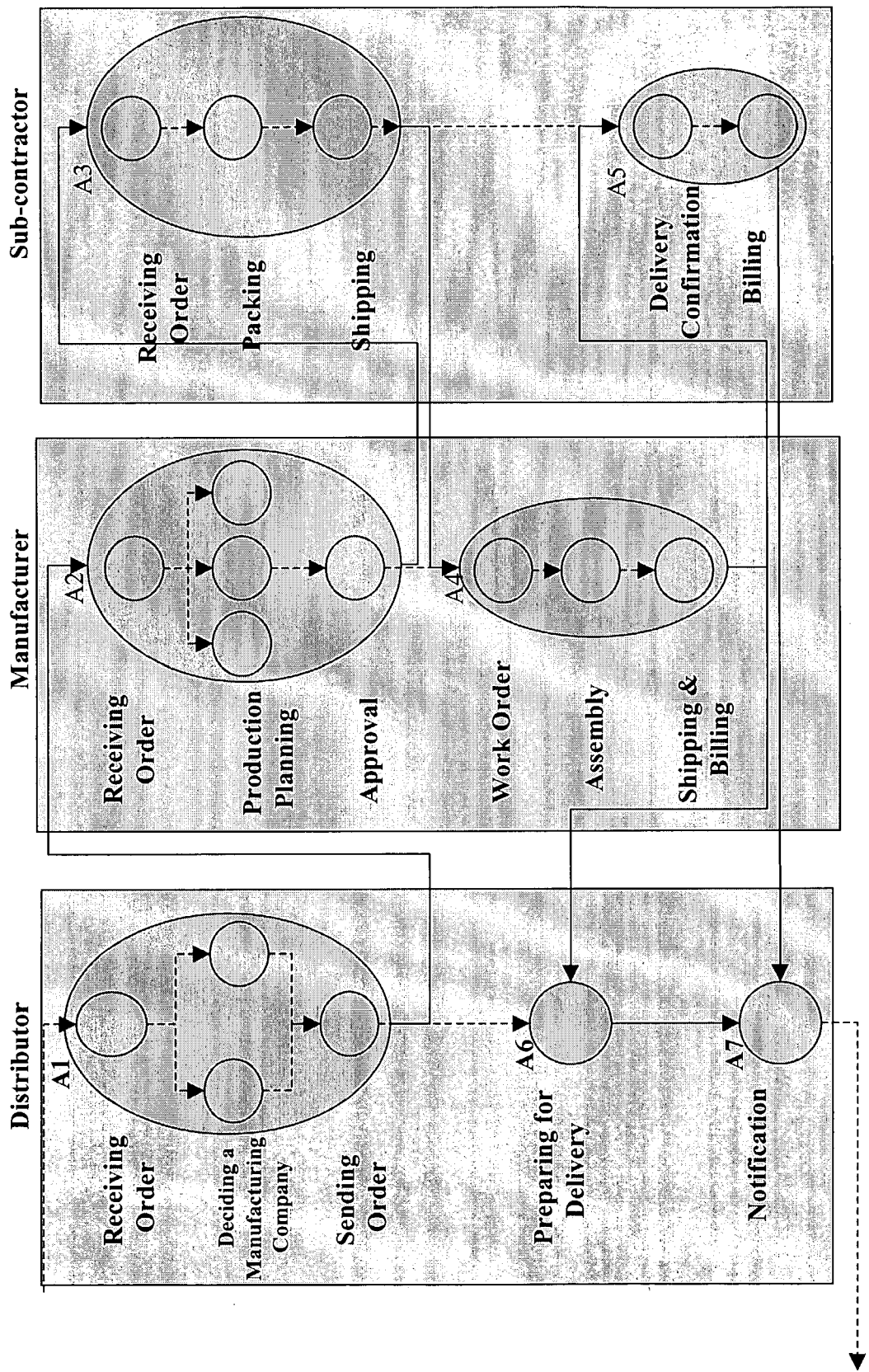
FIG. 2 conceptually illustrates a business process carried out over three companies.

Referring now to FIG. 2, a business process carried out over three companies—a distributor, manufacturer, and sub-contractor—is conceptually shown for illustrative purposes. The business process includes internal and external processes. Each company has its own internal processes. Each company also has external processes representing the interaction among companies. To illustrate, after receiving an order from a customer, the distributor may first determine a manufacturer that will produce the ordered product. Then, the order may be sent to the manufacturer. Determining a manufacturing company, an activity performed within the distribution company, need not be disclosed to the other companies. That activity qualifies as an internal process of the distribution company. In contrast, sending an order to the manufacturer is an external activity.

Figure 3:
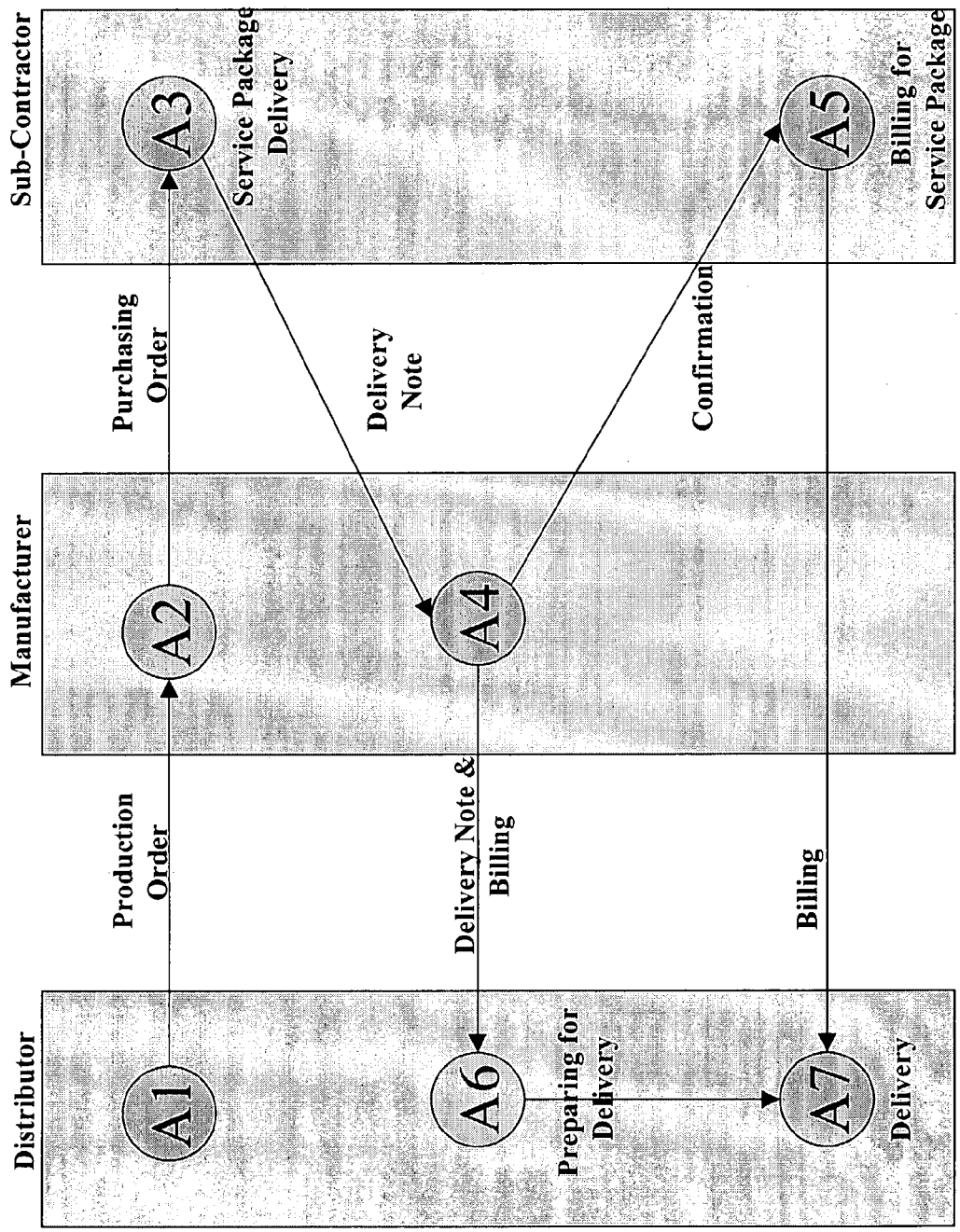
FIG. 3 conceptually illustrates an external process model for an exemplary business process carried out over three companies.

An external process may depend upon an internal activity. For example, in FIG. 2 "sending order", an internal activity of the distributor, triggers or calls for a process of the manufacturer. In contrast, activities that the distributor has carried out prior to "sending order" may have little or nothing to do with the external process. To distinguish internal activities from the external process, related internal activities are enclosed in a large circle as illustrated in FIG. 2, e.g., A1, A2, A3, A4 & A5. This notion to the external process, provides a simple intuitive model in FIG. 3.

An inter-organizational business process can be represented by a plurality of activities and their relationships. A company participating in the inter-organizational business process performs one or more activities. The performance of an activity by a company participating in the inter-organizational business process may also be considered a service. A relationship indicates the temporal sequence and/or logical precedence between two activities. An inter-organizational business process involves a plurality of companies performing activities. Any two activities that are inter-organizational activities and are directly connected are carried out by two different companies. Even a complex inter-organizational business process can be understood as a composition of such simple relations between two activities.

A preferred implementation of the present invention coordinates activities between two companies to control inter-organizational business processes. In particular, a request-response control methodology is employed to achieve the desired automatic coordination and control. Pursuant to the request-response control methodology, a company requests execution of an activity and another company responds to the request.

A mechanism for driving an inter-organizational business process is the exchanging of messages among participating companies. A completion of a service may generate a message, which is then transferred to the next service to notify it of the service completion. A message preferably includes two types of data—service-specific data (or application data) and service status data. Service-specific data may be any data pertaining to a service, such as specifications, quantity, availability, pricing, etc. As the control mechanism of the present invention does not depend upon details of service-specific data, such data is not a limitation of the present invention. The present invention may be practiced with any service specific data used for a business process.

According to a preferred implementation, with respect to service status data, there may be several types of messages, including (for example) completed and failed. A completed message is a message having a completed status, signifying that the corresponding service has been successfully performed. If a service could not be launched or its execution was terminated unsuccessfully, it generates a failed status message. Other examples include "suspend", "resume", and "terminate". A suspended message corresponds to an activity withheld temporarily, waiting for an input from other activities or so. A resume message restarts a suspended activity. A terminate message ends a process. A number of different types of messages and corresponding status data can be added as needed without departing from the scope of the present invention. The message types describe here are for illustration purpose only and do not limit the scope of the present invention.

The status of a message determines in part the response of a system in accordance with the present invention. A completed message is transmitted following the direction of its associated link specified in an inter-organizational business process. In contrast, a failed message is conveyed in the opposite direction. The former is referred to herein as a forward transition, and the latter a backward transition.

Figure 4:
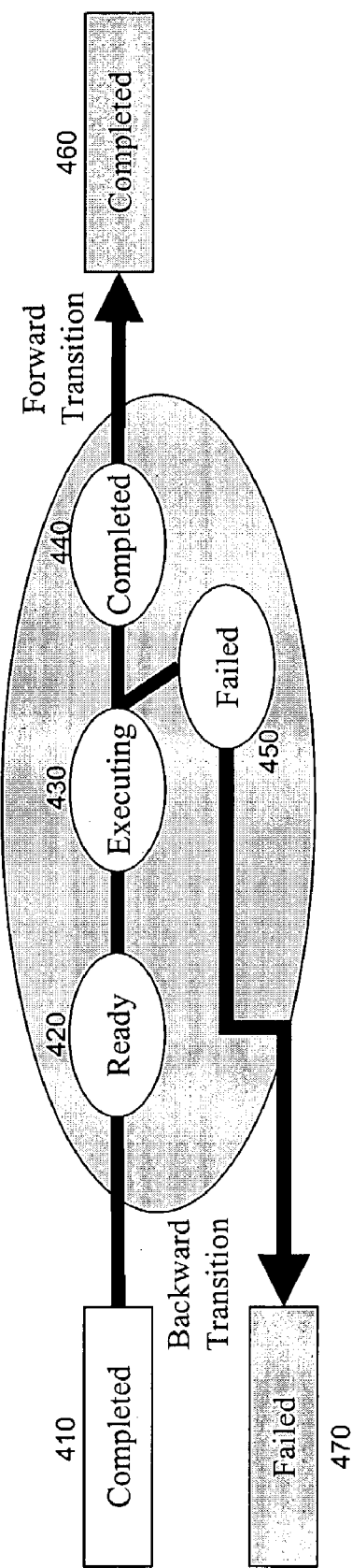
FIG. 4 conceptually illustrates a forward transition mechanism for a completed message in accordance with an exemplary implementation of the present invention.

To execute services specified in an inter-organizational business process model in accordance with an exemplary implementation of the present invention, messages exchanged by participating companies create a chain reaction as follows. First, referring to FIG. 4, as the preceding service has been carried out successfully, the present service receives a completed message 410. This changes the status of the current service to ready 420 and then to executing 430. The executed service can be either completed 440 or failed 450. If the executed service is completed 440, the service creates another completed message 460 and sends it to the next service as defined in the inter-organizational business process model. This is a forward transition. In contrast, if the executed service fails 450, the inter-organizational business process cannot continue its progress in the given direction. Consequently, a failed message is created 470 and sent back to the previous service. This is a backward transition.

Figure 5:
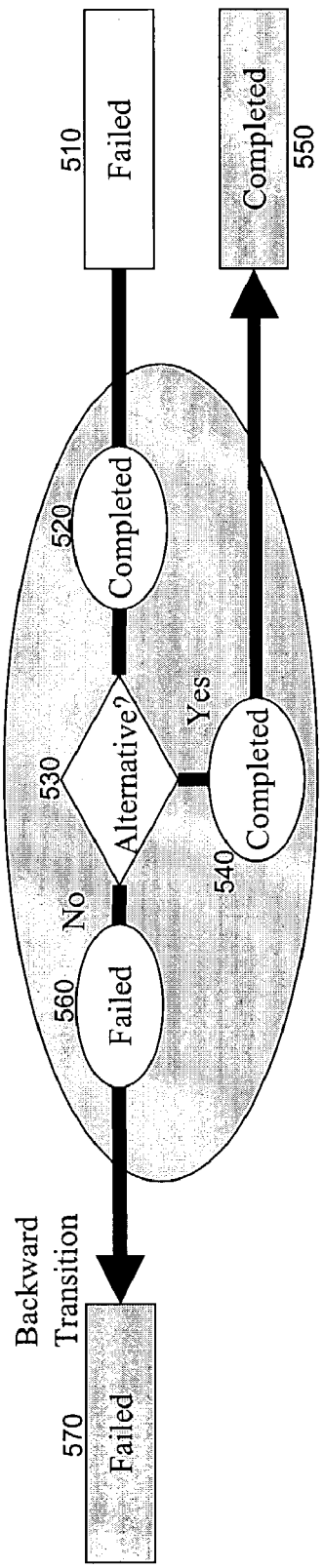
FIG. 5 conceptually illustrates a backward transition mechanism for a failed message in accordance with an exemplary implementation of the present invention.

Now referring to FIG. 5, a service receives a failed message 510 because execution of a succeeding service (which can be the immediate next succeeding service or a subsequent service) failed. As the notified service has already been completed successfully, it has sent a completed message 520 to its next service. If the notified service involves an OR or XOR branch, the failed message guides the current service to search for an alternative succeeding service among the services that have not already been executed 530. If an alternative exists, the status is set as completed 540 and the notified service sends a completed message 550 to the alternative. However, if an alternative is unavailable, which may be because either the applicable logical control does not contemplate or allow alternatives or because all alternatives are exhausted, then the status is set as failed 560 and the notified service sends a failed message 570 back to its directly preceding service.

The message exchange system and methodology, as discussed above and conceptually illustrated in FIGS. 4 and 5, thus provides a means for controlling an inter-organizational business process.

In a preferred implementation, the message exchange system and methodology are XML-enabled. An inter-organizational business process is preferably modeled in XML. Likewise, the message exchanged is defined in XML. The XML document for an inter-organizational business process model is referred to herein as an X-IBP. The XML document for a message is referred to herein as an X-MSG. Controlling a process entails conveying X-MSG's in accordance with service flows represented in X-IBP's. This entails interpreting both XML documents, i.e., X-IBP and X-MSG. Advantageously, the interpretation can be performed with a conventional XML parser, avoiding the need for a hard-coded workflow application.

To interpret an XML document, an XML parser refers to an XSL document that contains parsing logic defining how to transform and process the XML document. The interpretation can vary depending upon the XSL document to which the XML parser refers. This flexibility, often touted as an advantage of XML, is leveraged by the present invention to control an inter-organizational business process. This is accomplished by extracting general process control logic from inter-organizational business process models, and then transforming the extracted logic into XSL process control logic, referred to herein as XS-PCL. An XML parser refers to the XS-PCL to interpret X-IBP and X-MSG. This makes it possible to automatically control execution of inter-organizational business process processes without hard-coded workflow applications.

Figure 6:
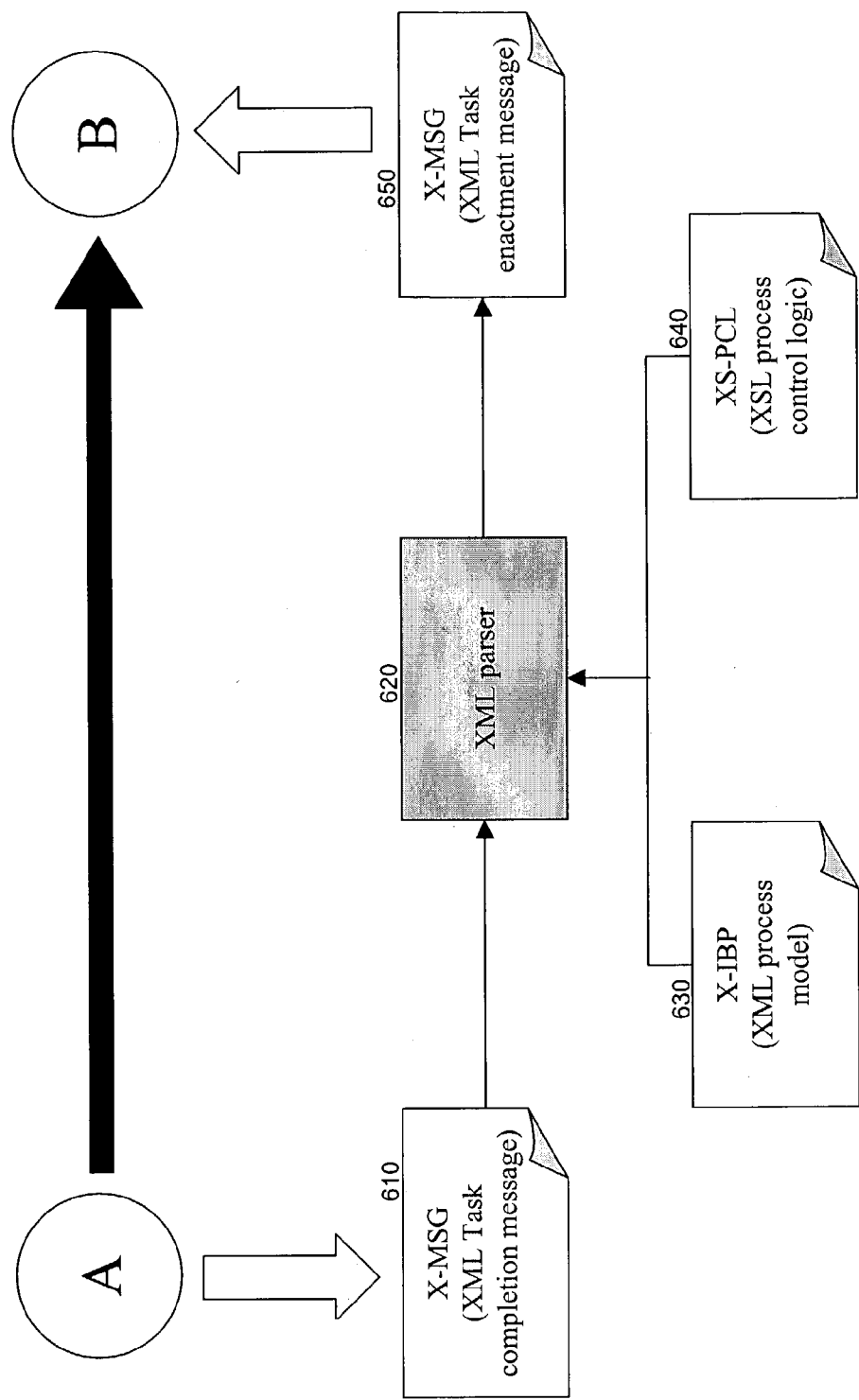
FIG. 6 conceptually illustrates an exchange of XML messages for implementing an inter-organizational business process using a request-response methodology in accordance with an exemplary implementation of the present invention.

FIG. 6 illustrates how the exchange of XML messages can implement an inter-organizational business process. It conceptually shows two services A and B, with service B immediately following service A. In accordance with the request-response methodology, the completion of service A triggers execution of service B, as follows:

(1) When service A is completed successfully, a completed X-MSG 610 is created.

(2) The X-MSG 610 is delivered to the XML parser 620. From the point of view of the parser, the message is a response-message to a request for service A by the parser.

(3) The XML parser 620 interprets X-IBP 630 and the X-MSG 610 by referring to XS-PCL 640. The parser 620 recognizes that service B should be executed after service A.

(4) The XML parser 620 creates a new X-MSG 650. From the point of view of the parser 620, the message is a request-message for service B.

(5) The new X-MSG 650 is delivered to service B for execution.

In a preferred implementation, the transformation of an inter-organizational business process into XML, i.e., an X-IBP, is a two-part process. The inter-organizational business process is first transformed into a tree-structured model. The tree-structured model is then represented in XML.

Transformation into a tree-structured model first involves identifying process patterns, called blocks, which make it possible to use predetermined rules for actual process control. As used herein, a block is a unit of representation that minimally specifies the behavioral pattern of process flow. By way of example and not limitation, blocks may be serial, AND-parallel, OR-parallel, XOR-parallel, CON-parallel and iterative blocks. The table provided in FIG. 7 describes control logic for each block. Complex processes can be considered a composition of the block types. An original activity in a process model is referred to herein as a primitive activity.

A block may contain other blocks. A block provides a simple means of identifying process control logic. As a block type defines a logical pattern of process flows, a set of rules can be predefined to control the pattern of process flows for each block type. Those skilled in the art will appreciate that block types are not limited and can be expanded or newly created depending upon the needs of the applications without departing from the scope of the present invention.

Figure 8:
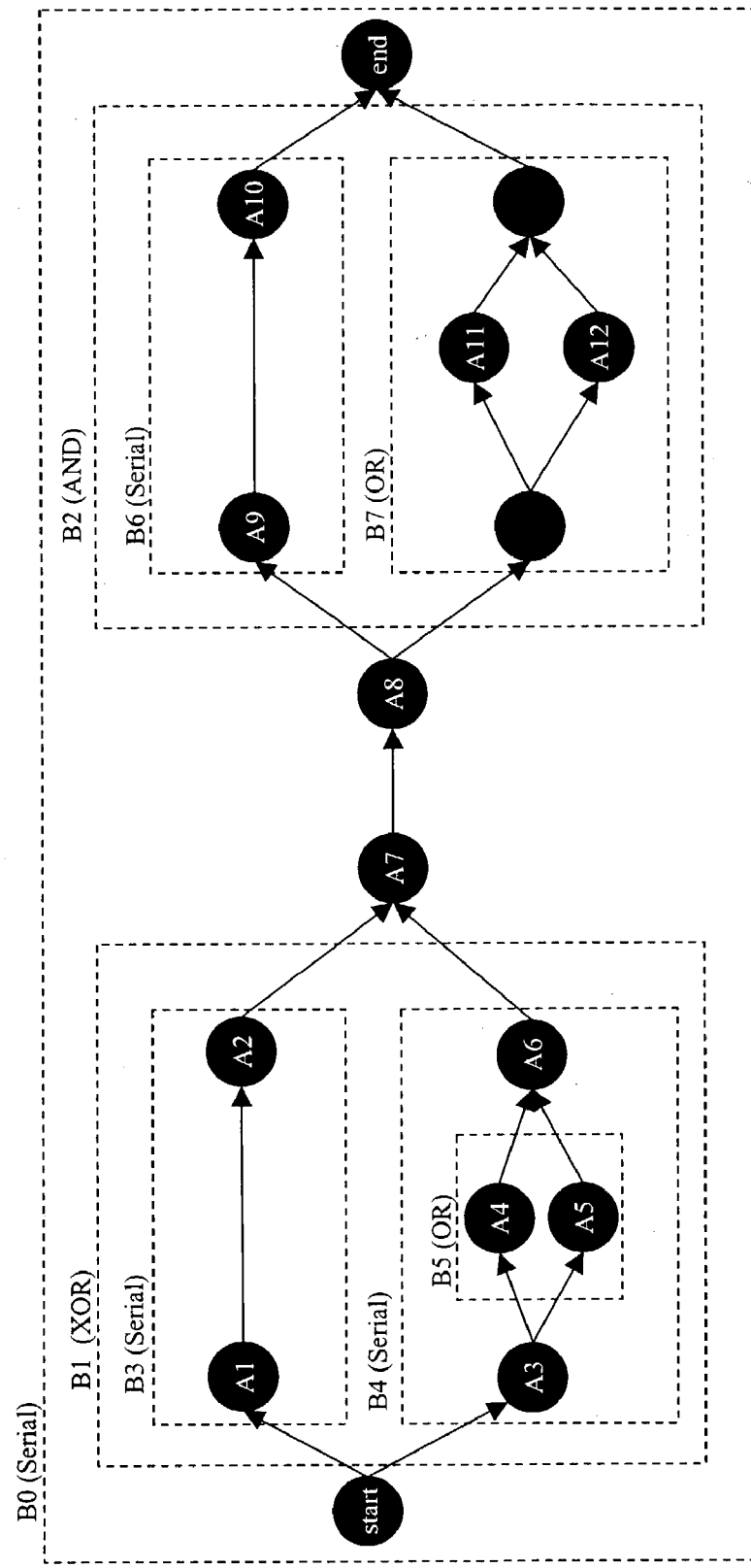
FIG. 8 conceptually illustrates an exemplary process model and corresponding blocks, i.e., specifications of the behavioral pattern of process flows.

A process model may be transformed into a tree of blocks or a tree model. For example, the process model in FIG. 8 may be broken down into several blocks, which may then be rearranged into a tree model as in FIG. 9. Each node of the tree may be represented as an XML element. Additionally, the tree structure, or the parent-child relation of nodes, is transformed into an XML representation. A block type element may contain sub-elements that correspond to the block type element's child nodes. An exemplary Document Type Definition (DTD) used for the representation is provided in FIG. 10.

An XML representation of the tree model includes attributes describing the type and status of nodes, both of which are required for execution control. The type attribute may, for example and not limitation, be serial, AND-parallel, OR-parallel, XOR-parallel, CON-parallel, iterative and primitive. As the type of attribute for a node does not change over time (unless the process changes), it is considered static. The status attribute represents the execution status of a node. By way of example and not limitation, a status attribute can be one of Ready, Executing, Completed, or Failed. As a node's status changes depending upon the status of the other nodes linked with it, the status attribute is dynamic.

Figure 9:
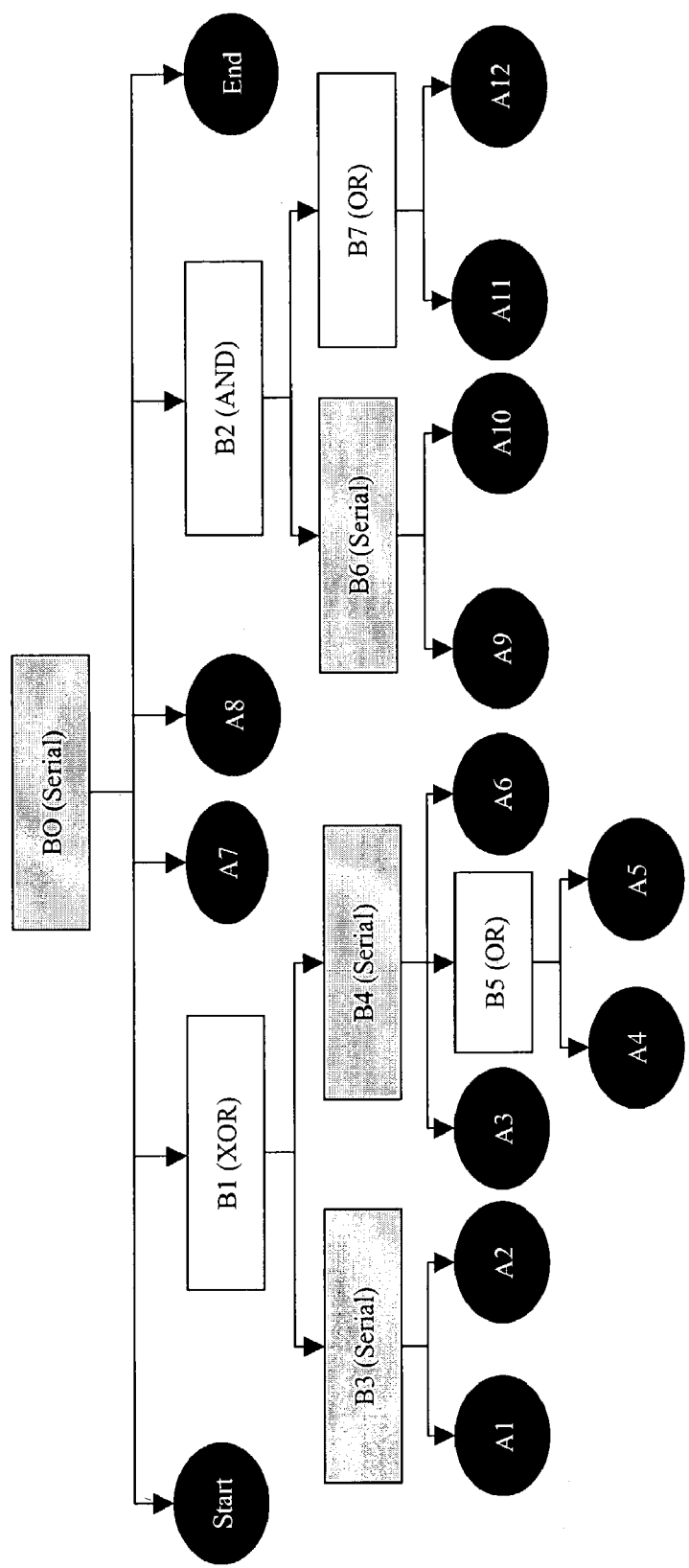
FIG. 9 conceptually illustrates an exemplary tree model used in transforming an inter-organizational business process into an XML representation, i.e., an X-IBP.

Referring now to FIG. 11, an exemplary X-IBP document representing the block tree in FIG. 9 is shown. Only the body part of the XML document is shown. A parent-child relation between a block node and its components can be recursively identified in the representation. Every element for a primitive activity node may, for example, have four types of sub-elements, such as an activity name, a description, a participating company carrying out the activity, and messages the company generates. By way of example, the child elements of activity A7 indicate that the service is "Receiving production order", the activity is serviced by ABC company, and it specifies links for request and response messages with which the company should deal.

Those skilled in the art will appreciate that a system and methodology in accordance with the present invention may have additional, fewer and/or different types of sub-elements. The present invention is not limited in the number and contents of the activities or its component elements.

In an X-IBP, a process model is modularized into a set of blocks. As it is possible to predefine the control logic for each block type, the modularized representation facilitates process control. The control logic stems from the following characteristics of block trees.

(1) The root node of an XML block tree is a serial block comprised of a start activity, an end activity, and a sequence of other nodes between the start and end activities.

(2) A leaf node of a block tree is a primitive activity. Interim nodes represent blocks.

(3) Every node, except the root node, has only one parent. Otherwise, the node involves cycles and no longer qualifies as a tree.

(4) A serial block cannot have another serial block in its parent or child nodes. A serial block is the maximum set of nodes forming a sequential pattern. However, all the serial activities do not have to be included in one serial block. For practical reasons, there is a need that some serial activities may belong to different blocks, although they are at the same level.

(5) If a parent node of a parallel node is a serial node, then the first sibling node of the parallel node must be a primitive activity. Thus, there should be an activity at which the parallel block can be split. In other words, two parallel blocks whose parent is a serial block cannot be adjacent.

Figure 12:
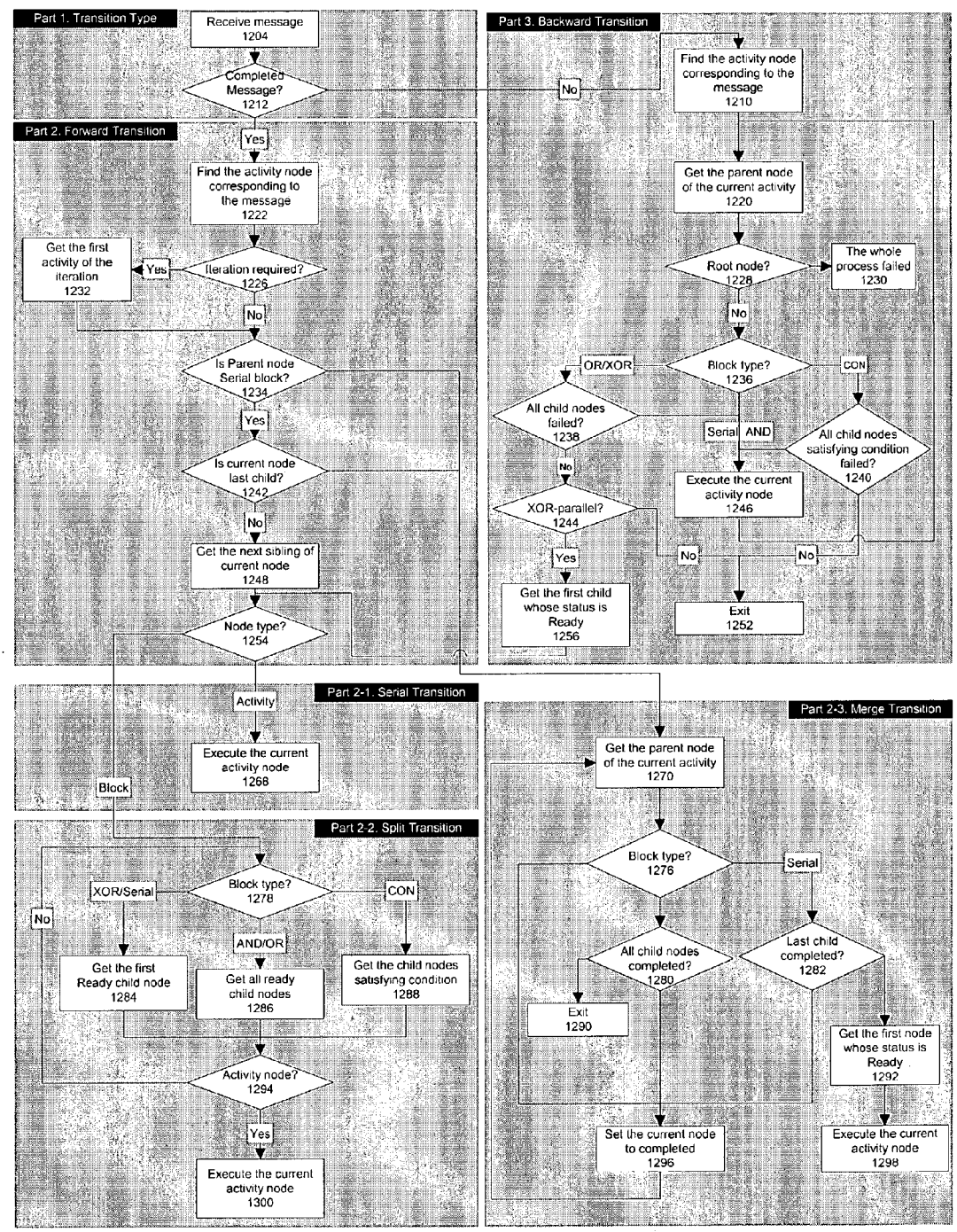
FIG. 12 is a flowchart illustrating process control logic in accordance with an exemplary implementation of the present invention.

Those skilled in the art will appreciate that the foregoing characteristics may be used to extract and implement control logic from a block tree representation. The control logic for an XS-PCL in accordance with an exemplary implementation of the present invention, as shown in the flowchart of FIG. 12, is divided into three parts. A first part (Part 1 in FIG.

12) determines whether a process flow is a forward transition or backward transition 1204–1212. When a performed service generates a completed message, the service calls a second part (Part 2 in FIG. 12) 1212–1222 that tests for iterations 1226–1232 and invokes 1234–1254 a forward transition (Parts 2-1, 2—2 and 2-3 in FIG. 12). In contrast, a performed service that generates a failed message calls a third part (Part 3 in FIG. 12) 1212–1210 that invokes a backward transition.

Figure 13:
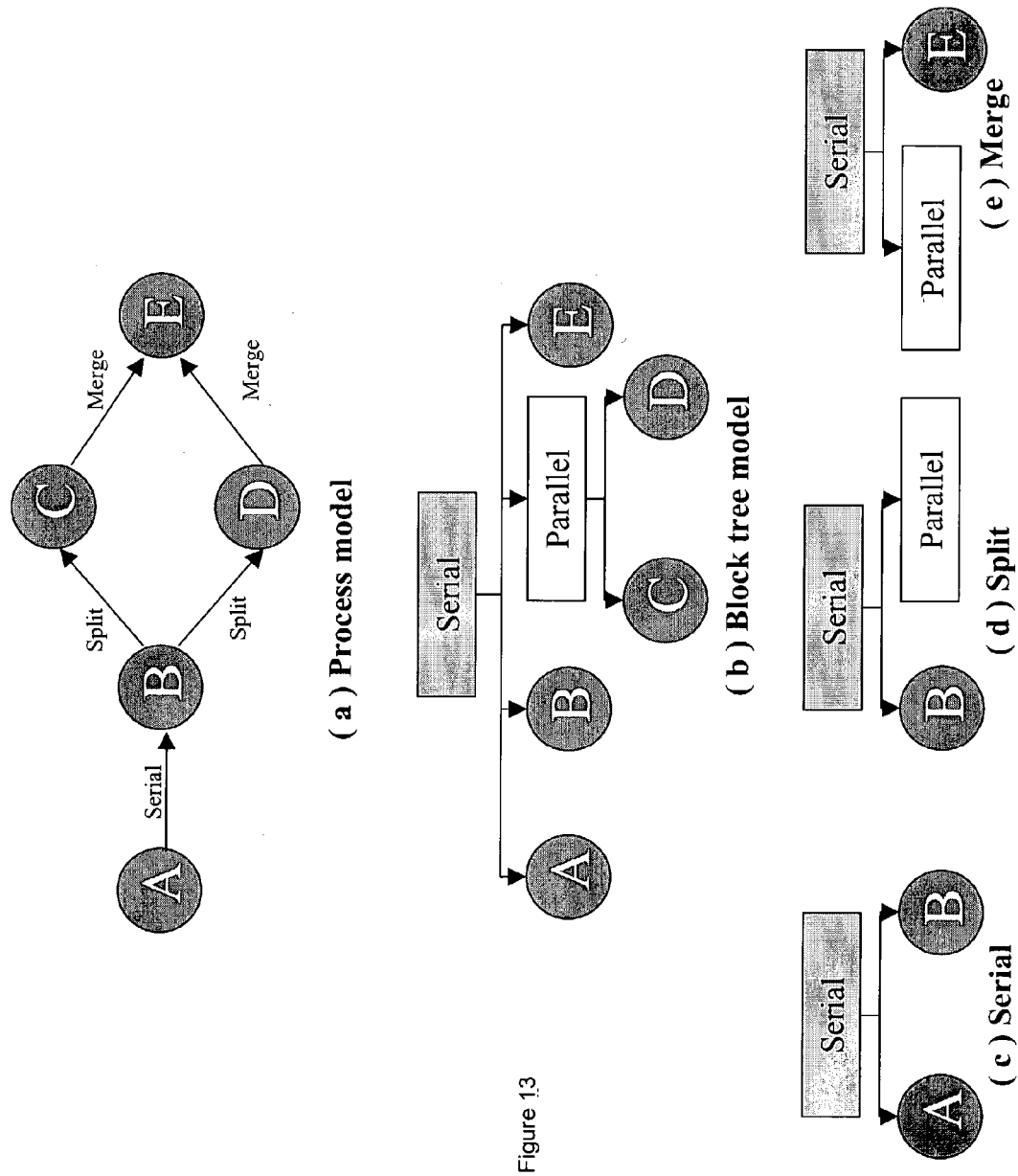
FIG. 13 conceptually illustrates types of forward transitions for process modeling and process control logic development in accordance with an implementation of the present invention.

The second part (Part 2 in FIG. 12) initially tests if iteration is required 1226. If iteration is required, control is transferred to the activity and the iteration starts 1232. If iteration is not required or if required iteration has been performed, the exemplary process then examines the tree structure of X-IBP to determine the transition type 1234–1254. Forward transitions may be of three types—serial (Part 2-1 in FIG. 12), split (Part 2-2 in FIG. 12), and merge (Part 2-3 in FIG. 12) transitions. The transition type may be determined by the link between two adjacent services. FIGS. 13 (*a*) and (*b*) conceptually present the transition types in a process diagram and a corresponding block tree model. The control logic may be divided into three parts.

A serial transition, as conceptually presented in FIG. 13(*c*), exists when a service is directly linked with only one succeeding service. It is represented in a block tree with a serial block node and two child nodes, where both child nodes are activity nodes. Upon completing activity A, control is transferred to sibling activity B for execution. Referring again to FIG. 12, if a parent node is a serial block 1234, and a current node is not the last child 1242, and the next sibling of the current node is an activity 1254, then a serial transition exists. Control of a serial transition is conceptually illustrated in part 2-1 of the flowchart in FIG. 12.

A split transition as conceptually shown in FIG. 13(*d*), has as a parent a serial block, and as a sibling a parallel block. When the activity node B is completed, the branches contained in the parallel block proceed concurrently depending upon the block type. According to FIG. 13(*b*), the completion of activity B should trigger execution of the succeeding branches of activities C and D. If the parallel node includes another parallel block, the control logic is recursively applied. Control of a split transition is conceptually illustrated in part 2-2 of the flowchart in FIG. 12.

Third, a merge transition, as conceptually presented in FIG. 13(*e*), includes a parallel block and a merge activity. A split, as shown in FIG. 13(*a*), is followed by a merge, meaning that if a parallel block and an activity node appearing in the depicted order share a same serial block as their parent, then the transition is a merge transition. Controlling a merge transition, as conceptually illustrated in part 2-3 of the flowchart in FIG. 12, first requires testing whether the parallel block is completed or not. Completion of the parallel block triggers execution of the merge activity node. The type of parallel block involved determines the criteria for completion. For example, if the block type is AND-parallel, the merge activity E is executed only when all child nodes of the AND-parallel block, namely activities C and D, are completed. When the parallel block involves other blocks instead of simple primitive activities, the same test procedure is applied recursively until a completion or failure determination is made for the parallel block. Control of a merge transition is conceptually illustrated in part 2-3 of the flowchart in FIG. 12.

A backward transition is reciprocal to forward transition in the sense that a forward transition is triggered with a successful completion of a node while a backward transition is triggered with a failure of a node. The failure of any activity influences the status of the entire block to which the activity belongs. When execution of an activity fails, the status of the parent block is tested for possible failure 1220. This will depend upon the block type 1236. For example, if a block type is Serial, AND-parallel, or CON-parallel, then any failure of a child node results in failure of the whole block 1240, 1246. However, an OR-parallel block fails only when all of its child nodes fail 1238. For an XOR-parallel block, a failure in one child node triggers another child node. Nodes in an XOR-parallel block execute one by one until one is successfully completed 1244, 1256. If none of the child nodes are successfully completed, the XOR-parallel block fails. Failure in a block recursively influences the status of its parent node in such a cascading manner. This chain reaction may extend to the root node of the block tree, which may result in a failure of the entire process.

XS-PCL preferably includes two parts; one specifying the process control logic, and the other for creating an XML message that will trigger the next service(s). FIG. 14 provides a portion of an XS-PCL for illustrative purposes. As XSL is an XML document, XS-PCL follows XML syntax.

The upper part of FIG. 14 provides exemplary control logic that corresponds to the beginning of part 2 in FIG. 12. Those skilled in the art will appreciate that it expresses rules to identify a completed activity and determine a type of forward transition for the activity. The rules are preferably triggered when an XML parser reads the root node of an X-IBP. The XS-PCL portion provided will cause a parser to examine an activity's parent block and next sibling as described above.

The element <xsl:when> tests if the type of a completed activity's parent block is serial. For each descendant activity that the parser encounters after the root node, the "test" attribute first determines if the activity's ID is identical to the ID of the service that the "wfms_key" parameter represents. An X-MSG received from a completed service provides this parameter value. Next, the identified activity's parent block is confined to a serial block. The remainder checks the completed activity's sibling to determine the transition type.

The lower part of FIG. 14 includes exemplary commands for creating an X-MSG of "Completed". Once a parser has identified an activity that should be executed, the service for the participating company for the identified activity is preferably notified. This may be achieved by delivering a "Completed" message. The <xsl:template> named "completed—message" as shown in FIG. 14 is invoked by another <xsl:template> that identifies the next service. The remainder of the XS-PCL as shown creates an X-MSG and saves it in a file named "file_name".

Figure 15:
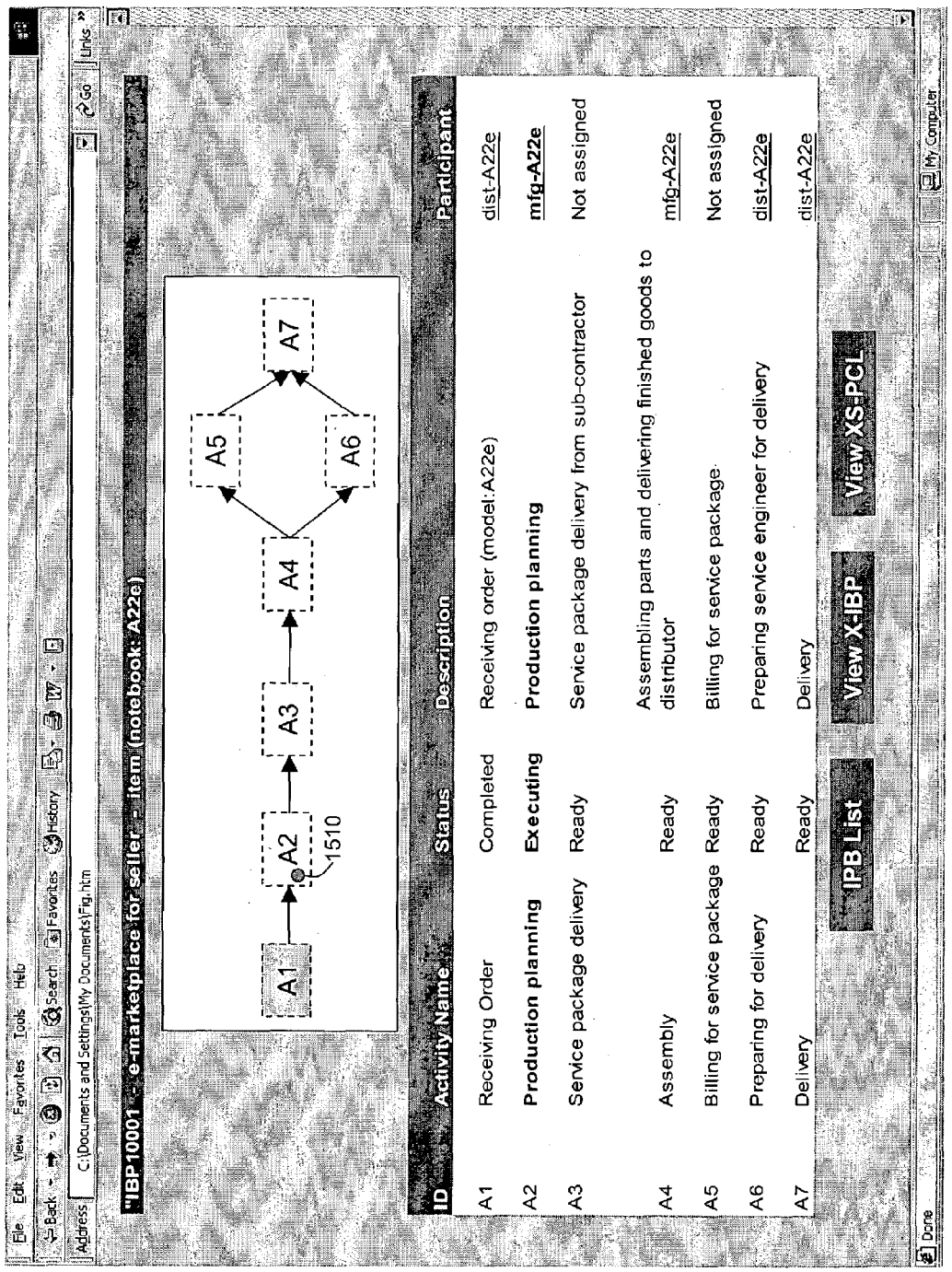
FIG. 15, shows a user interface of an exemplary system for inter-organizational business process implementation in accordance with the present invention.

Now referring to FIG. 15, a user interface of an exemplary system for inter-organizational business process implementation in accordance with the present invention is conceptually shown. The user interface conceptually displays a representation of an exemplary inter-organizational business process model in accordance with the process depicted in FIG. 2. The system is preferably Web-based thereby facilitating access to monitor the status of a business processes using conventional Web browsers.

The user interface in FIG. 15 displays a graphic inter-organizational business process model for an exemplary X-IBP. The graphic model is equivalent to the inter-organizational business process model in FIG. 3. Darker icons, e.g., A1, preferably distinguish completed activities, such as by indicating that an activity has been completed. A small circle in the corner of an activity icon, such as 1510 in activity A2, signifies that the service is currently being activated. Those skilled in the art will appreciate that other user interfaces, graphic representations of inter-organizational business processes, indicators of completion and signifiers of activation may be employed without departing from the scope of the present invention.

An inter-organizational business process model may be associated with internal processes of participating companies. An internal process may be triggered during execution of an inter-organizational business process. In a preferred implementation, the present invention supports internal workflow as well as inter-organizational processes.

Figure 16:
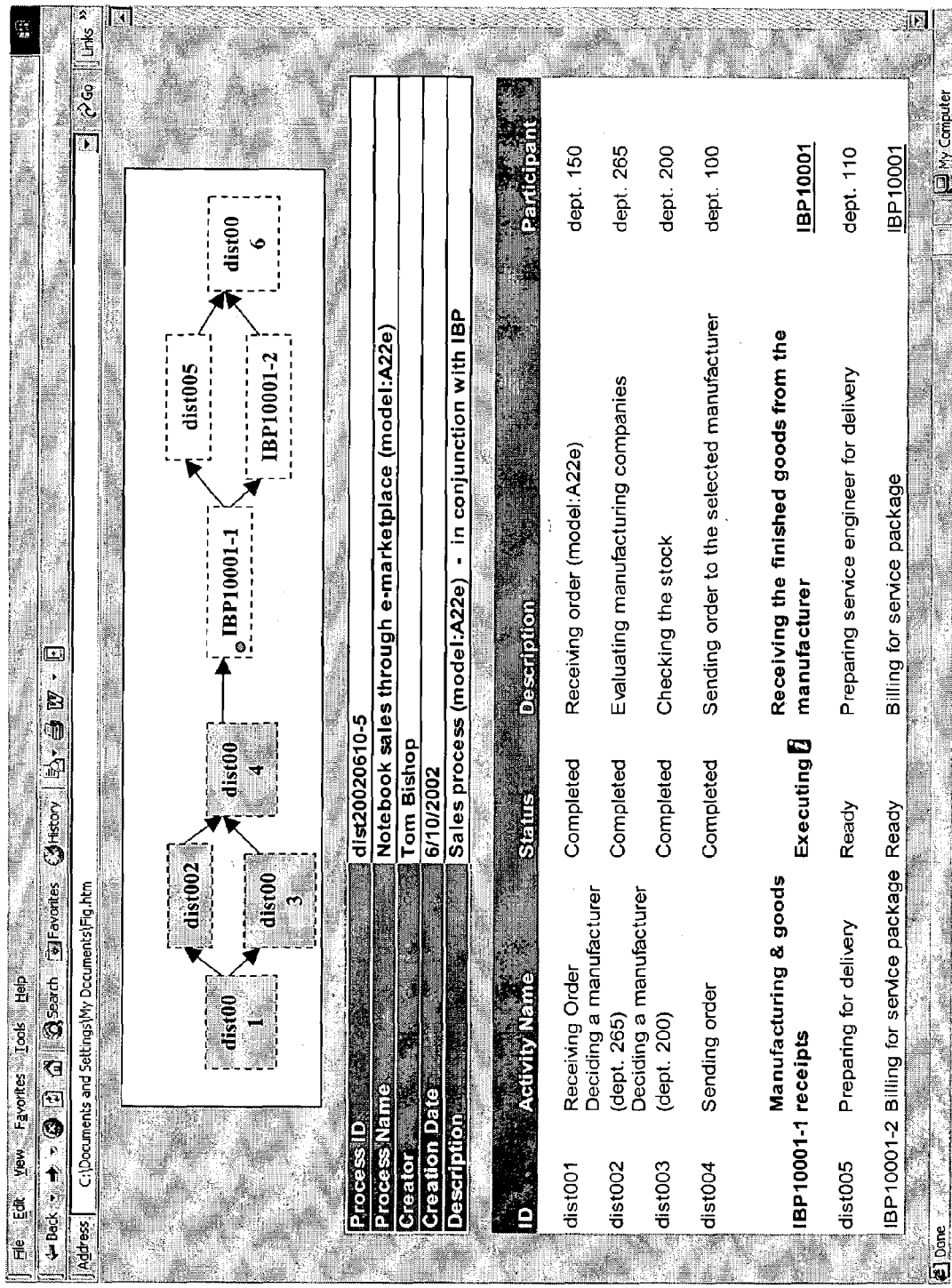
FIG. 16, shows a user interface of an exemplary system for inter-organizational business process implementation for a distribution company in accordance with the present invention.
Figure 17:
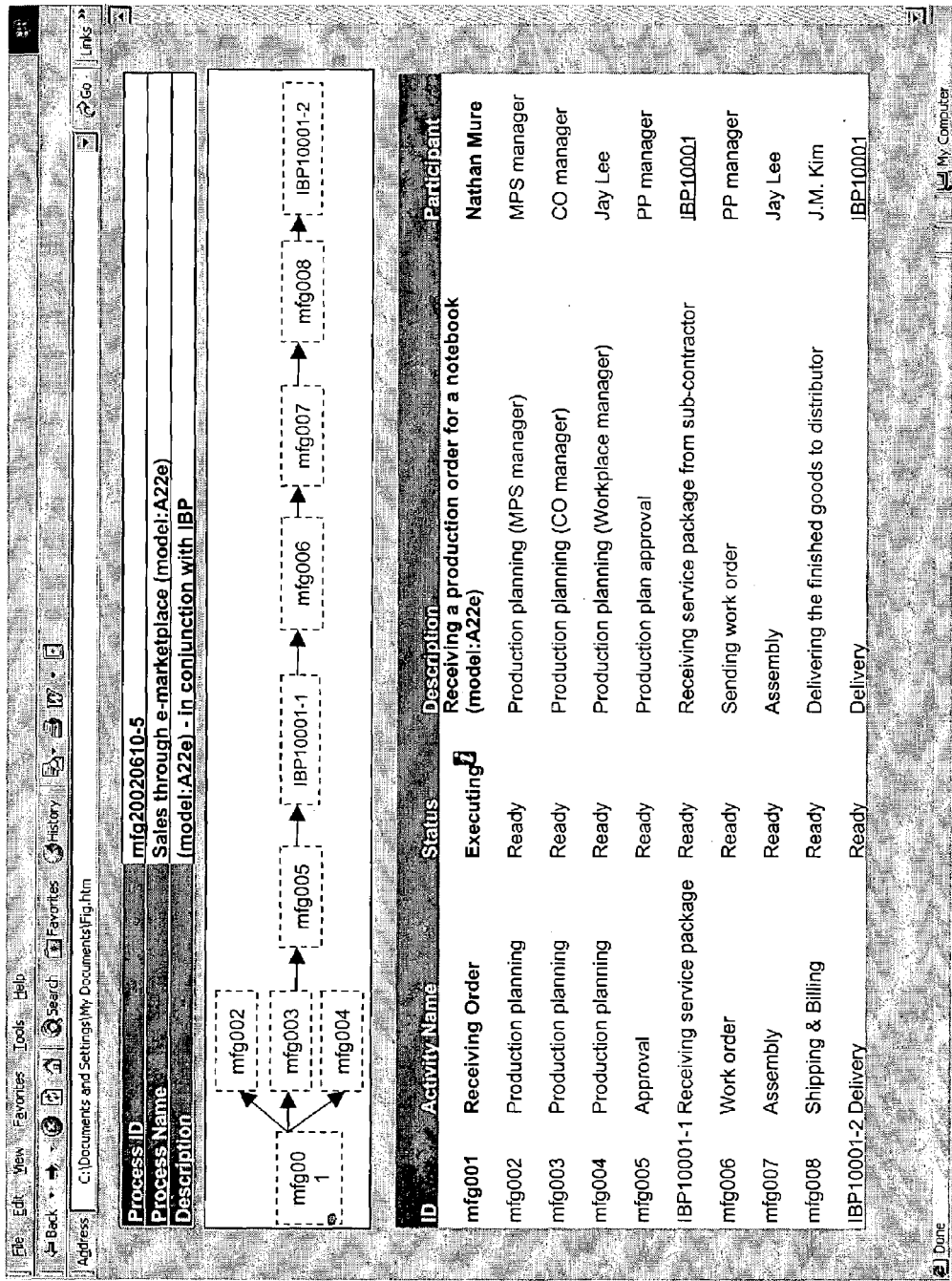
FIG. 17, shows a user interface of an exemplary system for inter-organizational business process implementation for a distribution company in accordance with the present invention.

FIGS. 16 and 17 conceptually illustrate use of an exemplary graphical user interface (GUI)-based system for controlling workflow processes in accordance with the present invention. By way of example, activities dist001 through dist004 of an internal process of a distribution company are completed as conceptually shown in FIG. 12. Upon completion of activity dist004, the exemplary system constructs an X-MSG for delivery to the next activity in the inter-organizational business process. The message is received and parsed along with inter-organizational business process model, triggering execution of the next activity, an inter-organizational business process, IBP10001-1, which is interwoven with the internal workflow. Upon completion of inter-organizational business process, IBP10001-1, the exemplary system will construct another X-MSG for delivery to one or both of the next parallel activities dist005 and IBP10001-2, depending of course upon the type of branch or block, e.g., CON, OR, XOR.

FIG. 17 shows a corresponding internal process for a manufacturing company. The distribution company's transmission of an order pursuant to activity dist004, as illustrated in FIG. 16, results in the manufacturing company's receipt of the order mfg001, as illustrated in FIG. 17. Upon completion of activity mfg001, the exemplary system will construct an X-MSG for delivery to the next activity or activities in the inter-organizational business process. The message is received and parsed along with the inter-organizational business process model, triggering execution of a subsequent activity. Other interactions can be controlled in the same way.

Thus the preferred implementation of the present invention provides a system and method for implementing an inter-organizational business process while effectively realizing external independency and internal encapsulation using message-based communication and leveraging XML technology. Advantageously, it provides an effective method of integrating heterogeneous workflow management systems. Furthermore, a system and method in accordance with the present invention may comply with standard e-business frameworks, such as ebXML, RosettaNet and cXML, meaning it can be readily employed in a company that uses such standards. Moreover, the preferred use of XML in modeling business processes not only facilitates the exchange of integrated business processes but also simplifies integration with legacy applications.

Another important advantage of the present invention is that it does not require a conventional workflow engine and database management system. These components, found in workflow management systems heretofore, are typically cumbersome, proprietary and expensive. Workflow engines are hard-coded, meaning they cannot be customized without accessing, modifying and compiling or assembling source code for the engine. They are utilized as compiled or assembled executable programs. As used herein, the term "compiled workflow engine" refers to a workflow engine that is hard-coded and utilized as a compiled or assembled program.

In contrast, the present invention employs a program such as an XML parser, many of which are widely available, to carry out the execution and control of workflow processes as specified in XML documents (e.g., X-MSG and X-IBP) according to an XSL document (e.g., XS-PCL) and a DTD. Thus, workflow process execution and control according to the present invention does not depend upon a compiled workflow engine or a database.

Yet another advantage of the present invention is that it provides a methodology for defining process control logic and a process model for a workflow. The methodology entails creating a tree model for the workflow process. Then a block model is created based on the tree model. From the block model, the process control logic and a process model are defined, preferably in XML and XSL documents as discussed above.

While the invention has been described in terms of preferred embodiments, those skilled in the art will recognize that the invention can be practiced with modification within the spirit and scope of the appended claims.

Having thus described the present invention, what is claimed as new and desired to be secured by Letters Patent is as follows:

1. A method of building, executing and controlling a workflow process without using a compiled workflow engine to execute and control the workflow process wherein the method is performed by a computer and comprises steps of:

providing a control logic for the workflow process;
providing a process model for the workflow process;
creating a message that requests execution of an activity, the message including activity-specific data and activity status data;
processing the message according to the process model and control logic for the workflow process; and
wherein the activity is comprised of one activity or a plurality of sub-activities, and the control logic includes at least one logic instruction selected from the group consisting of:
a serial instruction indicating that the activity should be executed promptly, and if the activity executes successfully then a completed status is associated with the activity, and if the activity does not execute successfully then a failed status is associated with the activity,
an AND-parallel instruction indicating that, if the activity is comprised of a plurality of sub-activities, the sub-activities should promptly be executed concurrently, and if all of the sub-activities execute successfully then a completed status is associated with the activity, and if any of the sub-activities do not execute successfully then a failed status is associated with the activity,
an OR-parallel instruction indicating that, if the activity is comprised of a plurality of sub-activities, the sub-activities should promptly be executed concurrently, and if a sub-activity executes successfully then a completed status is associated with the activity, and if all of the sub-activities do not execute successfully then a failed status is associated with the activity,
an XOR-parallel instruction indicating that, if the activity is comprised of a plurality of sub-activities, the sub-activities should promptly be executed in order of decreasing priority, from highest priority to lowest priority, until either a sub-activity executes successfully or the sub-activity having the lowest priority does not execute successfully, and if a sub-activity executes successfully then a completed status is associated with the activity, and if all of the sub-activities do not execute successfully then a failed status is associated with the activity, a CON-parallel instruction indicating that, if the activity is comprised of a plurality of sub-activities, a determination is made if each sub-activity meets a specified condition, and if all sub-activities that meet the specified condition execute successfully then a completed status is associated with the activity, and if all of the sub-activities that meet the condition do not execute successfully then a failed status is associated with the activity, an iteration instruction indicating that, if the activity is comprised of a plurality of sub-activities, the sub-activities should be executed cyclically until a determination is made if a specified iteration condition is satisfied, and if the iteration condition is satisfied then a completed status is associated with the activity.

2. The method of claim 1, wherein the process model is defined in a first uncompiled document and the control logic is defined in a second uncompiled document.

3. The method of claim 2, further comprising a step of creating a document type definition that defines the structure of the first uncompiled document.

4. The method of claim 3, wherein the activity status data further includes at least one flag from the group consisting of successful, failed, resume, suspend and terminate.

5. The method of claim 4, wherein the control logic further includes a first instruction for performing a forward transition if the activity status data includes a "successful" flag and a second instruction for performing a backward transition if the activity status data includes a "failed" flag.

6. The method of claim 5, wherein the control logic further includes a serial instruction indicating that the activity should be executed promptly.

7. The method of claim 6, further comprising a step of performing a forward transition if a completed status is associated with the activity, or a backward transition if a failed status is associated with the activity.

8. A system for executing and controlling a workflow process without a compiled workflow engine to execute and control the workflow process, comprising:

means for providing a control logic for the workflow process;

means for providing a process model for the workflow process;

means for creating a message that requests execution of an activity, the message including activity-specific data and activity status data;

means for processing the message according to the process model and control logic for the workflow; and wherein the activity is comprised of one activity or a plurality of sub-activities, and the control logic includes at least one logic instruction selected from the group consisting of:

a serial instruction indicating that the activity should be executed promptly, execution of the activity is completed if the activity is performed, and execution of the activity is failed if the activity does not perform, an AND-parallel instruction, the AND-parallel indicating that, if the activity is comprised of a plurality of sub-activities, the sub-activities should promptly be executed concurrently, and if all of the sub-activities execute successfully then a completed status should be associated with the activity, and if any of the sub-activities do not execute successfully then a failed status should be associated with the activity, an OR-parallel instruction indicating that, if the activity is comprised of a plurality of sub-activities, the sub-activities should promptly be executed concurrently, and if a sub-activity executes successfully then a completed status is associated with the activity, and if all of the sub-activities do not execute successfully then a failed status is associated with the activity, an XOR-parallel instruction indicating that, if the activity is comprised of a plurality of sub-activities, the sub-activities should promptly be executed in order of decreasing priority, from highest priority to lowest priority, until either a sub-activity executes successfully or the sub-activity having the lowest priority does not execute successfully, and if a sub-activity executes successfully then a completed status is associated with the activity, and if all of the sub-activities do not execute successfully then a failed status is associated with the activity, a CON-parallel instruction indicating that, if the activity is comprised of a plurality of sub-activities, a determination is made if each sub-activity meets a specified condition, and if all sub-activities that meet the specified condition execute successfully then a completed status is associated with the activity, and if all of the sub-activities that meet the condition do not execute successfully then a failed status is associated with the activity, an iteration instruction indicating that, if the activity is comprised of a plurality of sub-activities, the sub-activities should be executed cyclically until a determination is made if a specified iteration condition is satisfied, and if the iteration condition is satisfied then a completed status is associated with the activity, and the system further includes means for associating a completed status with the activity if the activity executes successfully, and means for associating a failed status with the activity if the activity does not execute successfully.

9. The system of claim 8, wherein the means for providing a process model is a first uncompiled document and the means for providing a control logic is a second uncompiled document having a structure.

10. The system of claim 9, further comprising a document type definition that defines the structure of the first uncompiled document.

11. The system of claim 10, wherein the activity status data further includes at least one flag from the group consisting of successful, failed, resume, suspend and terminate.

12. The system of claim 11, wherein the control logic further includes a first instruction for performing a forward transition if the activity status data includes a "successful" flag and a second instruction for performing a backward transition if the activity status data includes a "failed" flag.

13. The system of claim 12, wherein the control logic further includes a serial instruction indicating that the activity should be executed promptly, and means for associating a completed status with the activity if the activity executes successfully, and means for associating a failed status with the activity if the activity does not execute successfully.

14. The system of claim 13 further comprising a means for performing a forward transition if a completed status is associated with the activity, or a backward transition if a completed status is associated with the activity.

15. The system of claim 14, wherein the means for performing a first activity includes an extensible markup language parser, the means for creating a message requesting execution of an activity includes an extensible markup language command, the message includes an extensible markup language document, and the means for providing control logic for the workflow process includes an extensible stylesheet document.

16. A method of building, executing and controlling a workflow process without using a compiled workflow engine to execute and control the workflow process, wherein the method is performed by a computer and comprises steps of:

analyzing the workflow process into a unit;
arranging the unit under a set of rules;
associating the unit with a workflow control logic;
creating a process model;
requesting an activity;
processing the activity based on the process model and the workflow control logic; and
sending a response when the activity is complete,
wherein the process model is specified in a document type definition language,
wherein the activity is specified in a extensible mark up language,
wherein the workflow control logic is specified in an extensible style sheet language, and
wherein the workflow control logic is comprised of at least one instruction from the group consisting of:
a serial instruction indicating that an activity should be executed promptly, and if the activity executes successfully then a completed status is associated with the activity, and if the activity does not execute successfully then a failed status is associated with the activity,
an AND-parallel instruction indicating that, if the activity is comprised of a plurality of sub-activities, the sub-activities should promptly be executed concurrently, and if all of the sub-activities execute successfully then a completed status is associated with the activity, and if any of the sub-activities do not execute successfully then a failed status is associated with the activity,
an OR-parallel instruction indicating that, if the activity is comprised of a plurality of sub-activities, the sub-activities should promptly be executed concurrently, and if a sub-activity executes successfully then a completed status is associated with the activity, and if all of the sub-activities do not execute successfully then a failed status is associated with the activity,
an XOR-parallel instruction indicating that, if the activity is comprised of a plurality of sub-activities, the sub-activities should promptly be executed in order of decreasing priority, from highest priority to lowest priority, until either a sub-activity executes successfully or the sub-activity having the lowest priority does not execute successfully, and if a sub-activity executes successfully then a completed status is associated with the activity, and if all of the sub-activities do not execute successfully then a failed status is associated with the activity,
a CON-parallel instruction indicating that, if the activity is comprised of a plurality of sub-activities, a determination is made if each sub-activity meets a specified condition, and if all sub-activities that meet the specified condition execute successfully then a completed status is associated with the activity, and if all of the sub-activities that meet the condition do not execute successfully then a failed status is associated with the activity,
an iteration instruction indicating that, if the activity is comprised of a plurality of sub-activities, the sub-activities should be executed cyclically until a determination is made if a specified iteration condition is satisfied, and if the iteration condition is satisfied then a completed status is associated with the activity.

17. The method of claim 16, wherein the processing step further comprises steps of:
performing a first activity;
creating a message requesting execution of a second activity, the message including activity-specific data and activity status data; and
specifying control logic information for the workflow process,
wherein the message can be processed according to the control logic information for the workflow process.

18. The method of claim 17, wherein the unit is a general-purpose component and independent of any specific process model.

19. The method of claim 18, wherein the analyzing step further comprises steps of:
creating a document type definition for describing a general structure of the process model;
transforming the process model into an extensible markup language-friendly structure; and
describing the workflow control logic in extensible stylesheet language.

20. The method of claim 19, wherein the extensible markup language friendly structure is a tree structure.

21. A system for executing and controlling a workflow process without a compiled workflow engine to execute and control the workflow process, comprising:
a message processor;
a process unit that defines a process model;
a control unit that provides a workflow control logic; and
a message unit that sends and receives a message between activities; and
wherein each activity is comprised of one activity or a plurality of sub-activities, and the control unit comprises a control logic that includes at least one logic instruction selected from the group consisting of:
a serial instruction indicating that the activity should be executed promptly, execution of the activity is completed if the activity is performed, and execution of the activity is failed if the activity does not perform,
an AND-parallel instruction, the AND-parallel indicating that, if the activity is comprised of a plurality of sub-activities, the sub-activities should promptly be executed concurrently, and if all of the sub-activities execute successfully then a completed status should be associated with the activity, and if any of the sub-activities do not execute successfully then a failed status should be associated with the activity,
an OR-parallel instruction indicating that, if the activity is comprised of a plurality of sub-activities, the sub-activities should promptly be executed concurrently, and if a sub-activity executes successfully then a completed status is associated with the activity, and if all of the sub-activities do not execute successfully then a failed status is associated with the activity,
an XOR-parallel instruction indicating that, if the activity is comprised of a plurality of sub-activities, the sub-activities should promptly be executed in order of decreasing priority, from highest priority to lowest priority, until either a sub-activity executes successfully or the sub-activity having the lowest priority does not execute successfully, and if a sub-activity executes successfully then a completed status is associated with the activity, and if all of the sub-activities do not execute successfully then a failed status is associated with the activity, a CON-parallel instruction indicating that, if the activity is comprised of a plurality of sub-activities, a determination is made if each sub-activity meets a specified condition, and if all sub-activities that meet the specified condition execute successfully then a completed status is associated with the activity, and if all of the sub-activities that meet the condition do not execute successfully then a failed status is associated with the activity, an iteration instruction indicating that, if the activity is comprised of a plurality of sub-activities, the sub-activities should be executed cyclically until a determination is made if a specified iteration condition is satisfied, and if the iteration condition is satisfied then a completed status is associated with the activity, and the system further includes means for associating a completed status with the activity if the activity executes successfully, and means for associating a failed status with the activity if the activity does not execute successfully.

22. The system of claim 21, wherein the message processor is an extensible markup language parser.

23. The system of claim 22, wherein the process unit has a document type definition that describes structures of the process model.

24. The system of claim 23, wherein the control unit is described in an extensible stylesheet language.

25. A method for defining a process control logic and a process model for a workflow, wherein the method is performed by a computer and comprises steps of:

creating a block model representing a workflow process, and transforming the block model into one or more uncompiled computer processable documents that do not require a compiled workflow engine for processing, with the one or more uncompiled computer processable documents defining a process control logic and a process model, wherein the block model is comprised of a tree-structured model of blocks, wherein the blocks in the tree of blocks include one or more blocks from the group comprising:

an AND-parallel block indicating that, if an activity is comprised of a plurality of sub-activities, the sub-activities should promptly be executed concurrently, and if all of the sub-activities execute successfully then a completed status is associated with the activity, and if any of the sub-activities do not execute successfully then a failed status is associated with the activity;

an OR-parallel block indicating that, if an activity is comprised of a plurality of sub-activities, the sub-activities should promptly be executed concurrently, and if a sub-activity executes successfully then a completed status is associated with the activity, and if all of the sub-activities do not execute successfully then a failed status is associated with the activity;

an XOR-parallel block indicating that, if an activity is comprised of a plurality of sub-activities, the sub-activities should promptly be executed in order of decreasing priority, from highest priority to lowest priority, until either a sub-activity executes successfully or the sub-activity having the lowest priority does not execute successfully, and if a sub-activity executes successfully then a completed status is associated with the activity, and if all of the sub-activities do not execute successfully then a failed status is associated with the activity;

a CON-parallel block indicating that, if an activity is comprised of a plurality of sub-activities, a determination is made if each sub-activity meets a specified condition, and if all sub-activities that meet the specified condition execute successfully then a completed status is associated with the activity, and if all of the sub-activities that meet the condition do not execute successfully then a failed status is associated with the activity; and an iteration block indicating that, if an activity is comprised of a plurality of sub-activities, the sub-activities should be executed cyclically until a determination is made if a specified iteration condition is satisfied, and if the iteration condition is satisfied then a completed status is associated with the activity.

26. A method according to claim 25, wherein the blocks in the tree of blocks include units of representation that specify a behavioral pattern of process flow.

27. A method according to claim 26, wherein the one or more uncompiled computer processable documents include one or more documents from the group comprising:

an XML document;

an XSL document; and a DTD document.

* * * * *